Jan. 1, 1929.
J. E. MUHLFELD ET AL
1,697,689
PROCESS OF BURNING FUEL IN FURNACES
Original Filed Feb. 25, 1919    2 Sheets-Sheet 1
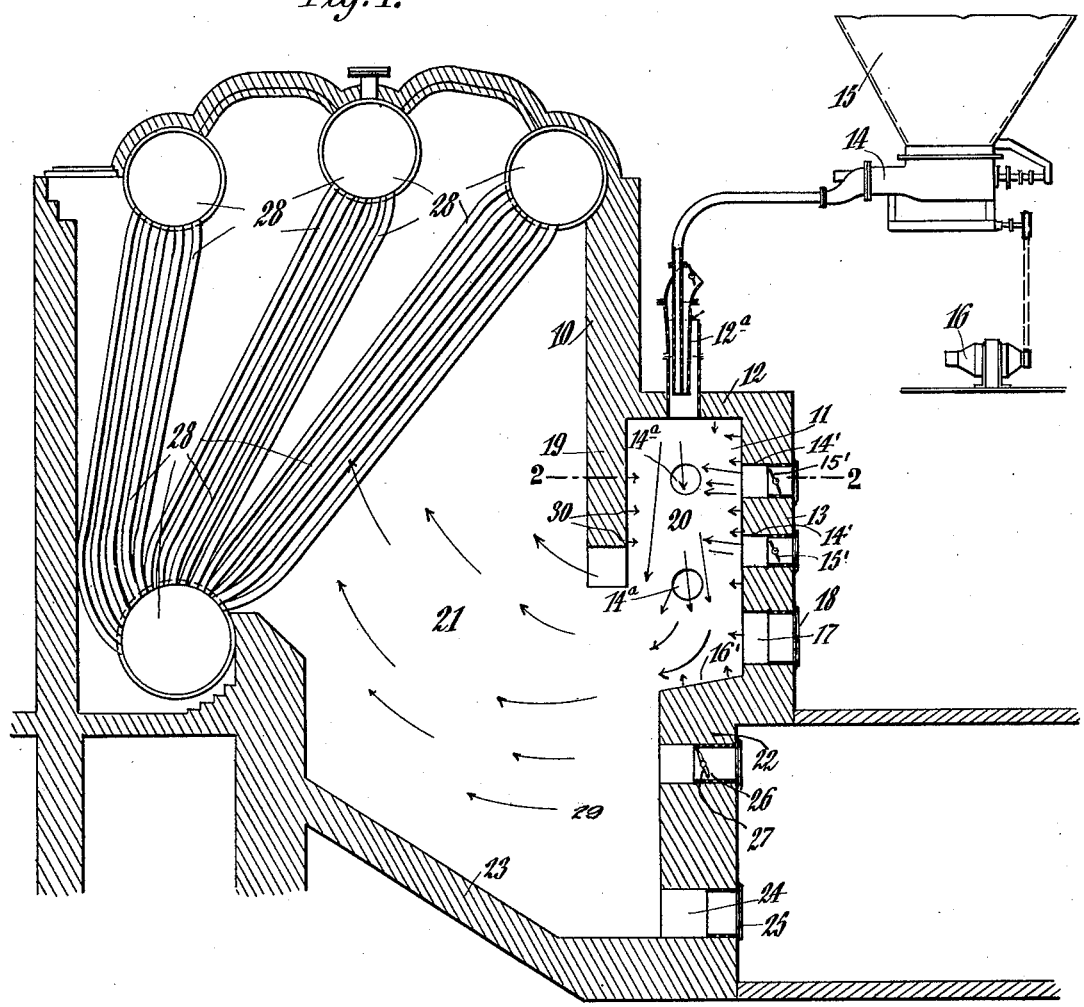
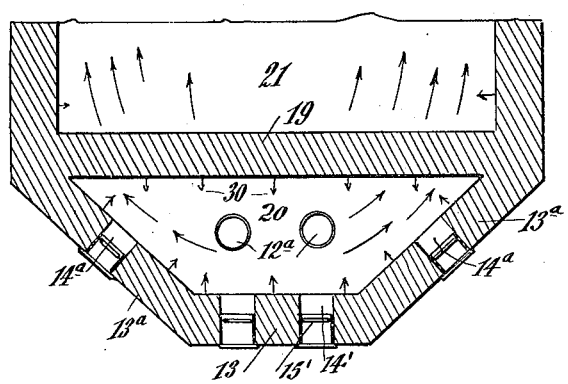
INVENTORS
John E. Muhlfeld and
Virginius Z. Caracristi
BY C. P. Goepel
ATTORNEY INVENTORS
John E. Muhlfeld and
Virginius Z. Caracristi
BY E. P. Loefel
ATTORNEY Patented Jan. 1, 1929.

1,697,689

UNITED STATES PATENT OFFICE.

JOHN E. MUHLFELD AND VIRGINIUS Z. CARACRISTI, OF SCARSDALE, NEW YORK, ASSIGNORS, BY MESNE ASSIGNMENTS, TO LOPULCO SYSTEMS, INC., OF NEW YORK, N. Y., A CORPORATION OF DELAWARE.

PROCESS OF BURNING FUEL IN FURNACES.

Original application filed February 25, 1919, Serial No. 279,155. Divided and this application filed September 5, 1919. Serial No. 321,976.

The present invention relates to improvements in processes of burning fuel in furnaces, the present disclosed embodiment relating particularly to boiler furnaces in which pulverized fuel is burned. The present application is a division of our copending application Serial No. 279,155, filed February 25, 1919. It is an object of the invention to provide a process by which combustion will be aided by feeding the fuel in connection with relatively large radiating surfaces, said radiating surfaces being perpendicular to prevent the accumulation of ash or other heat absorbing refuse thereon to render them at all times regenerative, and in this manner maintaining at all times a full efficiency of the radiating surfaces so as to aid in the combustion, permitting of the efficient burning of either low or high volatile fuels without refractory and other difficulties, and also providing an increased flameway.

It is a further object to provide a process by which the mixing of the fuel with air is arranged in consecutive steps, whereby a small proportion of the air necessary for combustion is induced into the furnace downwardly with the fuel and in line with the incoming fuel substantially in a perpendicular direction, and in which the additional air necessary for combustion is induced in a direction transverse to said first mentioned current, the resultant currents from the perpendicular and transverse currents, thereby insuring thorough mixing of air for combustion so that the greatest efficiency in mixing is obtained. A further object is to so burn the fuel as to permit the structure in which it is burned to be maintained in proper condition with facility and without interfering with the operation thereof.

A further object is to burn the fuel in preliminary and secondary combustion areas or zones into which combustion air may be independently directed, thereby improving the process of combustion, and further to provide a neutral zone of air which is a poor heat conductor, below the combustion zones and which zone of air will cool the ash passing therethrough to the bed of the furnace below substantial slag forming temperature.

One of the principal functions of the process is to permit the combustion to be completed at a point removed from the space provided for the deposit and removal of ash, so as to have an intervening non-conducting volume of air or air zone between the space in which the combustion takes place and the ashes or floor on which the deposit of ash accumulates, so as to maintain the temperature of said ash space below the melting point of ash, thereby preventing the formation of slag.

With these and other objects in view, examples of our process will be hereinafter described and structures suitable for carrying out the same are shown in the accompanying drawings, and will be hereinafter more fully described with reference thereto and the invention will be finally pointed out in the claims.

In the accompanying drawings,

Fig. 1 represents in vertical section one form of furnace of the boiler type adapted to carry out one process according to our invention;

Fig. 2 is a transverse sectional view taken through the line 2—2 of Fig. 1;

Similar reference characters indicate corresponding parts throughout the several figures of the drawings.

Figure 3:
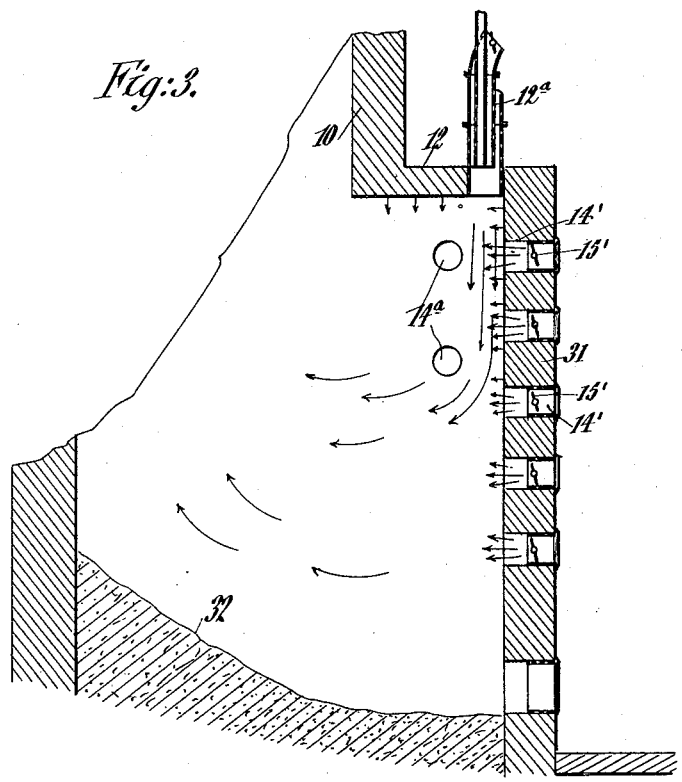
Fig. 3 is a view similar to that of Fig. 1 with parts broken away, showing another form of furnace for carrying out our invention.

Referring to Fig. 1 of the drawing, the furnace shown therein comprises a combustion chamber 10 having a forwardly projecting mixing chamber 11, in the top wall 12 of which there is disposed one or a plurality of fuel feed burners $12^a$ through which pulverized fuel mixed with air is fed by means of the apparatus 14 which receives the fuel from the bin 15 and is operated by the motor 16. Any suitable number and arrangement of these burners may be provided depending upon the capacity of the furnace. In the perpendicular front wall 13 of the mixing chamber there are provided a plurality of horizontally disposed auxiliary air feed pipes or openings 14' provided with controlling dampers 15'. Auxiliary air feed pipes or openings $14^a$ may also be located in the perpendicular side walls $13^a$, which diverge from the front wall to the parallel side walls so that incoming fuel and air flow in close contact therewith, these walls following the natural spread of the body of flame. Two such superimposed air feed pipes are shown in the drawing, but it will be understood that any number of these may be arranged along the length of the chamber and preferably they are arranged alternately to the vertical burners so that air is admitted between and at the sides of the streams.

The vertical feed burners 12$^a$ are preferably of the type as disclosed in our copending application, Serial No. 215,428, filed February 5th, 1918, and opposed thereto and below the auxiliary air feed pipes 14', there is provided a laterally disposed target wall 16' inclined downwardly from an opening 17 provided with a door 18, this target wall deflecting the incoming fuel into the furnace. A perpendicular baffle or partition wall 19 depends from the top wall 12 terminating at a point above the target wall 16', this wall separating the preliminary combustion area 20 of the mixing chamber from the secondary combustion area 21, an outlet space connecting the two areas being disposed between the corner formed by the target wall 16' and the vertical lower wall 22 and the lower end of the depending baffle wall 19.

Inclined upwardly from near the lower end of the lower vertical wall 22, there is provided a guide wall 23 forming the floor of the secondary combustion area 21 and being substantially opposed to the direction of flow of the fuel emanating from the outlet space between the preliminary and the secondary combustion areas. At the lower end of the wall 22 there is provided an outlet 24 having a door 25 for the removal of ash.

A plurality of horizontally disposed auxiliary air feed pipes 26 having controlling dampers 27, are provided in the lower wall 22 which admit air into the secondary combustion area.

The boiler 28 to be heated is arranged across the combustion chamber, this, however, being an arbitrary arrangement and other material or means to which heat is to be imparted may be suitably provided.

In operation the pulverized fuel enters the preliminary combustion area from the feed burners 12$^a$, these burners being such that these streams of mixed fuel and air are surrounded by streams of air and being directed into the preliminary combustion area, are subjected to radiant heat indicated by the arrows 30 from the perpendicular surface of the baffle 19 along which the fuel and flame flow and the perpendicular surfaces of the front wall 13 before they engage the target wall 16', which, during operation of the furnace, is incandescent. The heat radiating surfaces of the walls 19 and 13 being perpendicular prevent the accumulation of ash or other heat absorbing refuse. The transverse streams of air entering through the openings 14' tend to break up the surrounding layer of consumed gas permitting additional air to come into intimate contact with the partially consumed gas in the core of the flame causing complete combustion. The baffle wall 19, it will be seen, provides an increased radiating surface and flame-way along one side of which the fuel flows through the preliminary combustion area and near the other side of which it flows through the secondary combustion area providing in each case perpendicular heat radiating surfaces.

The bricks making up the target wall 16', because of its intense heat and the impingement of the fuel thereon, burn out and otherwise become affected so that renewal becomes necessary. Heretofore renewal or repairment of such parts necessitated the putting out of operation and complete cooling of the furnace. According to the present invention renewal of the target wall surface is permitted during operation of the furnace through the opening 17, this opening permitting insertion of the bricks by a suitable tool or the bricks may be thrown therein, thereby providing a new surface. The ash and other precipitated products of combustion slide along the inclined wall 23 to the outlet 24 where they may be removed.

The intervening distance between the target wall 16', and the space 29, being sufficient to decrease the temperature to a point below the melting point of ash, ash in a free state will be precipitated in such place, and such material is kept cleaned out of the furnace proper, the flame not impinging upon such non-combustible or non-radiating solids in view of the intervening air zone of poor heat conductivity. This intervening air zone constitutes in effect an excess body of air which may be termed a neutral zone inasmuch as substantially no combustion takes place therein.

We prefer to feed the fuel into the furnace, burn it in the presence of air currents which enter by induction in a direction transverse to the direction of flow of the descending fuel, and cause the flame and products of combustion to flow through the furnace toward the outlet all at a comparatively low velocity without impingement of the flame upon those products of combustion which precipitate and collect in the bottom and also without violent or forcible impingement upon the walls of the furnace. This slow movement of the products of combustion through the furnace over and across the body of excess air below the zone in which combustion takes place permits those products which are precipitated to fall to the bottom of the furnace through said body of air and it is best obtained by permitting the fuel admitted to substantially fall by gravity so as to be more readily deflected by the transverse currents of induced air. This body of air may be termed a neutral zone and it acts, among other things, to prevent fusion of those products of combustion which precipitate so that they are prevented from forming a mass of slag in the lower portion of the furnace incapable of removal.

In applying pulverized fuel burning equipment to steam generating plants it is highly important to prevent "slagging" of the evaporating surfaces. If this is not prevented efficient steaming cannot be had because the slag forms an insulating coating, as it were, which does not permit the ready absorption of the heat. In a furnace operated in accordance with our method slagging difficulties which have been so troublesome in this branch of the art are completely overcome. The flames do not carry along with them those products of combustion which fuse and form slag as they do in all previous furnaces with which I am familiar. These products are given a chance to precipitate because of the low velocity at which they are carried through the furnace, and because of the neutral zone of air through which they fall they do not fuse and form a solid mass of slag in the bottom of the furnace incapable of removal.

In Fig. 3 we have illustrated a modified form of construction in which the fuel feed burners 12ª have their outlets disposed adjacent and contiguous to the inner side of the front wall 31, which in this form extends uninterrupted to the base of the ash pit, in which the ashes 32 are precipitated, the said wall being provided at suitable points with auxiliary air feed pipes or opening 14' having controlling dampers 15' as before.

The perpendicular baffle or partition 19 is dispensed with in the showing of this form, although it will be understood that it may, if desired, be used in connection therewith. The incoming fuel and air flow contactingly along the perpendicular wall in intimate relation with the radiating heat therefrom indicated by the arrows 30, the increased radiating surface greatly aiding combustion, the perpendicular disposition of the radiating surface preventing the accumulation of ash or other heat absorbing refuse.

Figure 4:
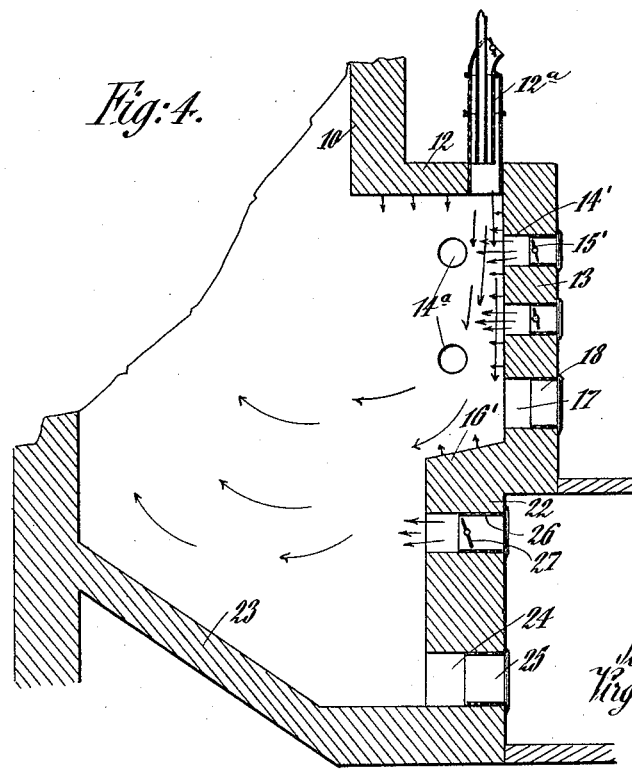
Fig. 4 is a view similar to Fig. 3 and showing a still further modified form of furnace for carrying out our invention.

In Fig. 4 a somewhat similar construction to that shown in Fig. 3 is shown, but in this form the target wall 16', is included in connection with the front wall 13 in a similar relation to the form shown in Fig. 1. It will be understood that in either of these forms shown in Figs. 3 and 4 a partition or baffle wall 19, such as shown in Fig. 1 may be included, and that this wall in any of the embodiments may be positioned at any desired distance from the front wall according to the degree of intimacy desired between the incoming fuel and air and the heat radiating surfaces.

We have described preferred and satisfactory examples of our invention and have shown satisfactory structures in which the same may be carried out, but it is obvious that changes may be made therein within the spirit and scope thereof as defined in the appended claims.

We claim:

1. The herein described method of burning pulverized fuel which consists in feeding the fuel into a furnace in a substantially vertically downward direction, in burning the fuel in the presence of induced air, in withdrawing the volatile products of combustion in a substantially vertical upward direction, and in allowing those products of combustion which are precipitated to pass through a zone of air below the zone in which combustion takes place and in which they are cooled in precipitating to temperatures adapted to avoid material fusion thereof.

2. The herein described process of burning pulverized fuel, which consists in admitting the fuel substantially vertically downwardly into the furnace, adjacent an upright wall thereof, in burning the fuel in the presence of air for combustion, in withdrawing the waste gaseous products of combustion upwardly, and in cooling the precipitating products of combustion substantially below the fusion temperature.

3. The herein described process of burning pulverized fuel, which consists in admitting the fuel substantially vertically downwardly into the furnace, adjacent an upright wall thereof, in burning the fuel in the presence of air for combustion, in withdrawing the waste gaseous products of combustion upwardly, and in cooling the precipitating products of combustion substantially below the fusion temperature, and in admitting the said air at a plurality of successive levels below the point of fuel admission.

4. The herein described process of burning pulverized fuel, which consists in admitting the fuel substantially vertically downwardly into the furnace adjacent an upright wall thereof, in burning the fuel in the presence of air for combustion, in withdrawing the waste gaseous products of combustion upwardly, and in cooling the precipitating products of combustion substantially below the fusion temperature, and in independently controllably admitting said air for combustion at a plurality of successive levels below the point of fuel admission.

5. The herein described process of burning pulverized fuel, which consists in admitting the fuel substantially vertically downwardly into the furnace to be subject to radiant heat, in burning the fuel in space and in the presence of air for combustion, in withdrawing the waste gaseous products of combustion upwardly, and in cooling refuse particles leaving the fuel and flame stream and passing toward a recipient surface to a temperature below their fusion temperature.

6. The herein described process of burning pulverized fuel in a steam generating furnace, which consists in admitting the fuel substantially vertically downwardly into the furnace to be subject to radiant heat, in burning the fuel, in withdrawing the waste gaseous products of combustion upwardly, and in providing a cooling zone marginal of the flame for the cooling of refuse particles leaving the fuel and flame stream.

In testimony that we claim the foregoing as our invention, we have signed our names hereunder.

JOHN E. MUHLFELD.
VIRGINIUS Z. CARACRISTI.